United States Patent Office 3,803,142
Patented Apr. 9, 1974

3,803,142
3-AMINO-2H,5,6-DIHYDRO-1,4-OXAZINES AND SALTS THEREOF
Helmut Stahle, Herbert Koppe, and Werner Kummer, Ingelheim am Rhein, Germany, assignors to Boehringer Ingelheim GmbH, Ingelheim am Rhein, Germany
No Drawing. Filed July 31, 1972, Ser. No. 276,399
Claims priority, application Germany, July 30, 1971, P 21 38 142.0
Int. Cl. C07d 87/48
U.S. Cl. 260—244 R      7 Claims

ABSTRACT OF THE DISCLOSURE

Compounds of the formula

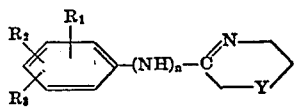

wherein
$R_1$, $R_2$ and $R_3$, which may be identical to or different from each other, are each hydrogen, fluorine, chlorine, bromine, alkyl of 1 to 3 carbon atoms, methoxy, ethoxy, cyano or trifluoromethyl,
Y is oxygen or sulfur, and
n is 1 or 2,
and their non-toxic, pharmacologically acceptable acid addition salts; the compounds as well as the salts are useful as analgesics.

---

This invention relates to novel 3-amino-2H,5,6-dihydro-1,4-oxazines and -thiazines and acid addition salts thereof, as well as to a method of preparing these compounds.

More particularly, the present invention relates to a novel class of 3-substituted 2H,5,6-dihydro-1,4-oxazines and -thiazines represented by the formula

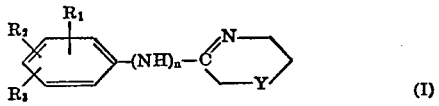

wherein
$R_1$, $R_2$ and $R_3$, which may be identical to or different from each other, are each hydrogen, fluorine, chlorine, bromine, alkyl of 1 to 3 carbon atoms, methoxy, ethoxy, cyano or trifluoromethyl,
Y is oxygen or sulfur, and
n is 1 or 2,
and their non-toxic, pharmacologically acceptable acid addition salts.

The compounds embraced by Formula I may be prepared by reacting a phenylamine or phenylhydrazine of the formula

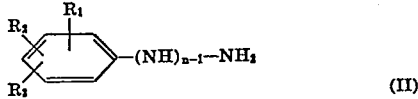

wherein $R_1$, $R_2$, $R_3$ and n have the same meanings as in Formula I, or an acid addition salt thereof, with a 3-substituted dihydro-oxazine or -thiazine of the formula

wherein
Y has the same meanings as in Formula I, and
$R_4$ is a reactive substituent, especially chlorine, bromine, alkoxy of 1 to 3 carbon atoms, alkylthio of 1 to 3 carbon atoms or amino,
or an acid addition salt thereof.

In those instances where one or both of the reactants are used in the form of an acid addition salt, the reaction is advantageously carried out in the presence of an acid-binding agent.

The reaction may be carried out in the presence of an inert organic solvent or also with the reactants in the molten state in the absence of a solvent medium. The reaction temperature may vary within wide limits, but it is most advantageously between −5 and +170° C., and preferably 20 to 130° C.

The compounds embraced by Formula I are organic bases and therefore form acid addition salts with inorganic or organic acids. Examples of non-toxic, pharmacologically acceptable acid addition salts are those formed with hydrochloric acid, hydrobromic acid, hydroiodic acid, hydrofluoric acid, sulfuric acid, sulfonic acid, phosphoric acid, nitric acid, acetic acid, propionic acid, butyric acid, caproic acid, valeric acid, oxalic acid, malonic acid, succinic acid, maleic acid, fumaric acid, lactic acid, tartaric acid, citric acid, malic acid, benzoic acid, p-hydroxybenzoic acid, p-amino-benzoic acid, phthalic acid, cinnamic acid, salicyclic acid, ascorbic acid, methane-sulfonic acid, 8-chlorotheophylline or the like.

The following examples further illustrate the present invention and will enable others skilled in the art to understand it more completely. It should be understood, however, that the invention is not limited solely to the particular examples given below.

EXAMPLE 1

3-(4′-chloro-anilino)-2H,5,6-dihydro-1,4-thiazine and its hydrochloride 46.8 gm. (0.4 mol) of 3-oxo-thiomorpholine were dissolved in 150 ml. of absolute benzene and, while stirring the resulting solution at 20° C., 18.6 ml. of phosphorus oxychloride (0.5 mol) were added dropwise over a period of 30 minutes, and the mixture was then stirred for two hours at room temperature. Thereafter, the supernatant solution was decanted from the precipitated oil which was identified to be raw 3-chloro-2H-5,6-dihydro-1,4-thiazine.

The raw product thus obtained was admixed with 100 ml. of benzene and, while stirring the mixture at 20° C., a solution of 25.4 gm. (0.2 mol) of 4-chloro-aniline in 150 ml. of benzene was added dropwise over a period of 20 minutes. Subsequently, the reaction mixture was stirred for four hours more at 50 to 60° C., whereby a thick, hard crystalline slurry was formed.

The crystals were separated from the benzene and dissolved in hot water. The cooled aqueous solution was fractionally extracted with ether at pH-values from 4 to 10, each ethereal extract fraction being washed with water; the fractions obtained from the extractions at pH 8 to 10, which contained the desired product as determined by chromatography, were dried, combined and evaporated to dryness. The residue, 3-(4′-chloro-anilino)-2H,5,6-dihydro-1,4-thiazine, was dissolved in a little methanol, the calculated amount of ethereal hydrochloric acid was added to the solution, and the hydrochloride was precipitated by addition of ether. The precipitate was collected and recrystallized from a little methanol, yielding 16 gm. (30.4% of theory) of the compound of the formula

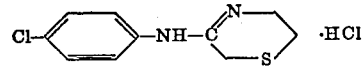

having a melting point of 288° C.

EXAMPLE 2

3-[N'-(2',4',6'-trichloro-phenyl)hydrazino]-2H,5,6-dihydro-1,4-thiazine hydroiodide A mixture consisting of 10 gm. (0.05 mol) of (2,4,6-trichloro-phenyl)-hydrazine, 13.75 gm. (0.05 mol) of 3-methylmercapto-2H,5,6-dihydro-1,4-thiazine hydroiodide (M.P. 136° C.) and 100 ml. of ethanol was refluxed for five hours. Thereafter, the reaction solution was cooled and then allowed to stand overnight in a refrigerator. The crystalline precipitate formed thereby was collected and recrystallized twice from ethanol, yielding 6.1 gm. (27.9% of theory) of the compound of the formula

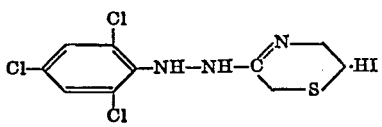

having a melting point of 219° C.

EXAMPLE 3

Using a procedure analogous to that described in Example 1, 3 - (2',4' - dichloro-anilino)-2H,5,6-dihydro-1,4-thiazine of the formula

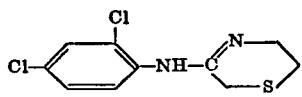

was prepared from 3-chloro-2H,5,6-dihydro-1,4-thiazine and 2,4-dichloro-aniline. Its hydrochloride had a melting point of 257° C. (decomp.).

EXAMPLE 4

Using a procedure analogous to that described in Example 1, 3-(2',6'-dichloro-anilino)-2H,5,6-dihydro - 1,4-thiazine of the formula

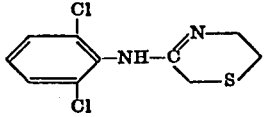

was prepared from 3-chloro-2H,5,6-dihydro-1,4-thiazine and 2,6-dichloro-aniline. Its hydrochloride had a melting point of 280° C. (decomp.).

EXAMPLE 5

Using a procedure analogous to that described in Example 1, 3-(2',4',6'-trichloro-anilino)-2H,5,6-dihydro-1,4-thiazine of the formula

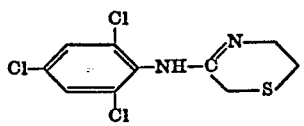

was prepared from 3-chloro-2H,5,6-dihydro-1,4-thiazine and 2,4,6-trichloro-aniline. Its hydrochloride had a melting point of 285° C. (decomp.).

EXAMPLE 6

Using a procedure analogous to that described in Example 1, 3-(2',6'-dimethyl-anilino)-2H,5,6-dihydro - 1,4-thiazine of the formula

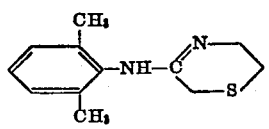

was prepared from 3-chloro-2H,5,6-dihydro-1,4-thiazine and 2,6-dimethyl-aniline. Its hydrochloride had a melting point of 222° C. (decomp.).

EXAMPLE 7

Using a procedure analogous to that described in Example 1, 3 - (2' - methoxy-anilino)-2H,5,6-dihydro-1,4-thiazine of the formula

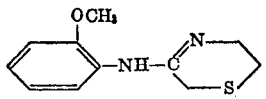

was prepared from 3-chloro-2H,5,6-dihydro-1,4-thiazine and 2-methoxy-aniline. Its hydrochloride had a melting point of 193° C. (decomp.).

EXAMPLE 8

Using a procedure analogous to that described in Example 1, 3-(3'-methoxy-anilino)-2H,5,6-dihydro-1,4-thiazine of the formula

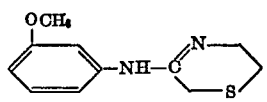

was prepared from 3-chloro-2H,5,6-dihydro-1,4-thiazine and 3-methoxy-aniline. Its oxalate had a melting point of 152° C. (decomp.).

EXAMPLE 9

Using a procedure analogous to that described in Example 1, 3-(4'-methoxy-anilino)-2H,5,6-dihydro-1,4-thiazine of the formula

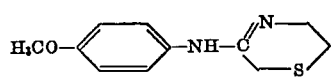

was prepared from 3-chloro-2H,5,6-dihydro-1,4-thiazine and 4-methoxy-aniline. Its hydrochloride had a melting point of 232° C. (decomp.).

EXAMPLE 10

Using a procedure analogous to that described in Example 1, 3-(2',6'-dichloro-anilino)-2H,5,6-dihydro-1,4-oxazine of the formula

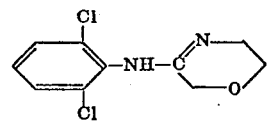

was prepared from 3-chloro-2H,5,6-dihydro-1,4-oxazine and 2,6-dichloro-aniline. Its hydrochloride had a melting point of 243° C. (decomp.).

EXAMPLE 11

Using a procedure analogous to that described in Example 1, 3-(2',6'-dimethyl-anilino)-2H,5,6-dihydro-1,4-oxazine of the formula

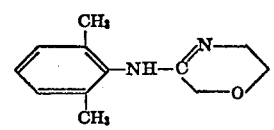

was prepared from 3-chloro-2H,5,6-dihydro-1,4-oxazine and 2,6-dimethyl-aniline. Its hydrochloride had a melting point of 247° C. (decomp.).

EXAMPLE 12

Using a procedure analogous to that described in Example 1, 3-(2'-chloro-6'-methyl-anilino)-2H,5,6-dihydro-1,4-oxazine of the formula

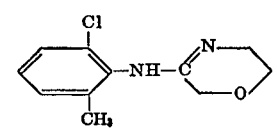

was prepared from 3-chloro-2H,5,6-dihydro-1,4-oxazine and 2-chloro-6-methyl-aniline. Its hydrochloride had a melting point of 228° C. (decomp.).

EXAMPLE 13

Using a procedure analogous to that described in Example 1, 3-(2'-methyl-4'-chloro-anilino)-2H,5,6-dihydro-1,4-oxazine of the formula

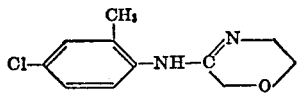

was prepared from 3-chloro-2H,5,6-dihydro-1,4-oxazine and 2-methyl-4-chloro-aniline. Its hydrochloride had a melting point of 212° C. (decomp.).

EXAMPLE 14

Using a procedure analogous to that described in Example 1, 3-(2'-methoxy-anilino)-2H,5,6-dihydro-1,4-oxazine of the formula

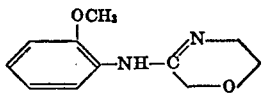

was prepared from 3-chloro-2H,5,6-dihydro-1,4-oxazine and 2-methoxy-aniline. Its hydrochloride had a melting point of 215° C. (decomp.).

EXAMPLE 15

Using a procedure analogous to that described in Example 1, 3-(3'-methoxy-anilino)-2H,5,6-dihydro-1,4-oxazine of the formula

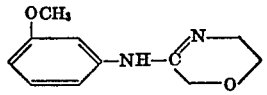

was prepared from 3-chloro-2H,5,6-dihydro-1,4-oxazine and 3-methoxy-aniline. Its oxalate had a melting point of 188° C. (decomp.).

EXAMPLE 16

Using a procedure analogous to that described in Example 1, 3-(4'-methoxy-anilino)-2H,5,6-dihydro-1,4-oxazine of the formula

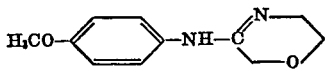

was prepared from 3-chloro-2H,5,6-dihydro-1,4-oxazine and 4-methoxy-aniline. Its oxalate had a melting point of 172° C. (decomp.).

EXAMPLE 17

Using a procedure analogous to that described in Example 2, 3-[N'-(2',6'-dichloro-phenyl)-hydrazine]-2H,5,6-dihydro-1,4-thiazine hydrochloride, M.P. 208° C. (decomp.), of the formula

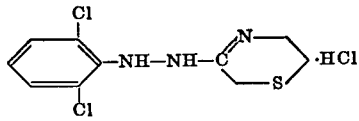

was prepared from (2,6-dichloro-phenyl)-hydrazine and 3-methylmercapto-2H,5,6-dihydro-1,4-thiazine hydrochloride.

EXAMPLE 18

Using a procedure analogous to that described in Example 2, 3-[N'-(2',6'-dichloro-phenyl)-hydrazino]-2H,5,6-dihydro-1,4-oxazine hydrochloride, M.P. 225° C. (decomp.), of the formula

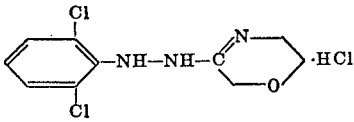

was prepared from (2,6-dichloro-phenyl)-hydrazine and 3-methylmercapto-2H,5,6-dihydro-1,4-oxazine hydrochloride.

EXAMPLE 19

Using a procedure analogous to that described in Example 2, 3-[N'-(2',4'-dichloro-phenyl)-hydrazine]-2H,5,6-dihydro-1,4-oxazine hydrochloride, M.P. 225° C. (decomp.), of the formula

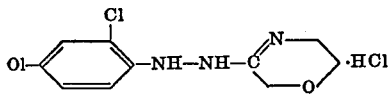

was prepared from (2,4-dichloro-phenyl)-hydrazine and 3-methylmercapto-2H,5,6-dihydro-1,4-oxazine hydrochloride.

EXAMPLE 20

Using a procedure analogous to that described in Example 2, 3-[N'-(2',6'-dimethyl-phenyl)-hydrazino]-2H,5,6-dihydro-1,4-oxazine oxalate, M.P. 195° C. (decomp.), of the formula

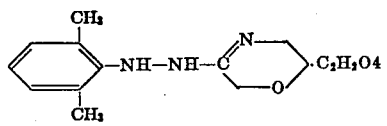

was prepared from (2,6-dimethyl-phenyl)-hydrazine and 3-methylmercapto-2H,5,6-dihydro-1,4-oxazine oxalate.

EXAMPLE 21

Using a procedure analogous to that described in Example 1, 3-(2',6'-dibromo-anilino)-2H,5,6 - dihydro - 1,4-oxazine of the formula

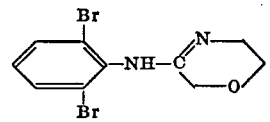

was prepared from 3-chloro-2H,5,6-dihydro-1,4-oxazine and 2,6-dibromo-aniline. Its hydrochloride had a melting point of 275–276° C. (decomp.).

EXAMPLE 22

Using a procedure analogous to that described in Example 1, 3-(2',4'-dibromo-anilino)-2H,5,6 - dihydro - 1,4-oxazine of the formula

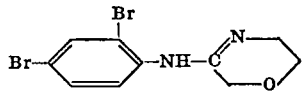

was prepared from 3-chloro-2H,5,6-dihydro-1,4-oxazine and 2,4-dibromo-aniline. Its hydrochloride had a melting point of 242° C. (decomp.).

EXAMPLE 23

Using a procedure analogous to that described in Example 1, 3-(4'-bromo-anilino)-2H,5,6-dihydro-1,4-oxazine of the formula

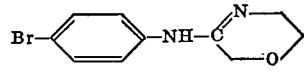

was prepared from 3-chloro-2H,5,6-dihydro-1,4-oxazine and 4-bromo-aniline. Its hydrochloride had a melting point of 255–256° C. (decomp.).

EXAMPLE 24

Using a procedure analogous to that described in Example 1, 3-anilino-2H,5,6-dihydro-1,4-oxazine of the formula

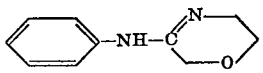

was prepared from 3-chloro-2H,5,6-dihydro-1,4-oxazine and aniline. Its hydrochloride had a melting point of 234–236° C. (decomp.).

The compounds embraced by Formula I and their non-toxic, pharmacologically acceptable acid addition salts have useful pharmacodynamic properties. More particularly, the compounds of the present invention exhibit significant and highly effective analgesic activity in warm-blooded animals, such as mice and rats.

The analgesic activity of the compounds of the instant invention was ascertained in mice by standard pharmacological test methods for analgesia, such as the hot-plate method and the writhing test. The results of these tests showed that the analgesic activity of the novel compounds, especially of the compounds of Examples 10, 11 and 12, approaches that of morphine.

On the other hand, the compounds of the invention were found to be analgesically completely ineffective in the Haffner tail-pinch test, which is strongly indicative of the absence of physical dependence capacity (addiction) in higher animals, such as monkeys and humans.

For pharmaceutical purposes the compounds according to the present invention are administered to warm-blooded animals perorally, enterally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.0083 to 1.67 mgm./kg. body weight, preferably 0.05 to 0.5 mgm./kg. body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 25

Tablets

The tablet composition is compounded from the following ingredients:

|  | Parts |
|---|---|
| 3 - (2' - chloro - 6' - methylanilino) - 2H,5,6-dihydro 1,4-oxazine hydrochloride | 40 |
| Corn starch | 164 |
| Sec. calcium phosphate | 240 |
| Magnesium stearate | 1 |
| Total | 445 |

Preparation: The individual ingredients are intimately admixed with each other, the mixture is granulated in conventional manner, and the dry granulate is compressed into 445 mgm.-tablets in a conventional tablet-making machine. Each tablet contains 40 mgm. of the oxazine compound and is an oral dosage unit composition with effective analgesic action.

EXAMPLE 26

Gelatin capsules

The capsule filler composition is compounded from the following ingredients:

|  | Parts |
|---|---|
| 3 - (2',6'-dimethyl-anilino) - 2H,5,6 - dihydro-1,4-oxazine hydrochloride | 25 |
| Corn starch | 175 |
| Total | 200 |

Preparation: The ingredients are intimately admixed with each other, and 200 mgm.-portions of the mixture are filled into gelatin capsules of suitable size. Each capsule contains 25 mgm. of the oxazine compound and is an oral dosage unit composition with effective analgesic action.

EXAMPLE 27

Hypodermic solution

The solution is compounded from the following ingredients:

|  | Parts |
|---|---|
| 3 - [N' - (2',6' - dichloro-phenyl)hydrazino]-2H,5,6-dihydro-1,4-oxazine hydrochloride | 2.5 |
| Sodium salt of EDTA | 0.2 |
| Distilled water q.s.ad 100.0 parts. | |

Preparation: The oxazine compound and the EDTA salt are dissolved in a sufficient amount of distilled water, and the solution is diluted with additional distilled water to the indicated volume and then filtered until free from suspended particles. The filtrate is filled into 1 cc.-ampules under aseptic conditions, and the filled ampules are sterilized and then sealed. Each ampule contains 25 mgm. of the oxazine compound, and the contents thereof are an injectable dosage unit composition with effective analgesic action.

Analogous results are obtained when any one of the other compounds embraced by Formula I or a non-toxic acid addition salt thereof is substituted for the particular oxazine compound in Examples 25 through 27. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that the various changes and modifications may be made without departing from the spirit of the invention or the scope of the appended claims.

We claim:
1. A compound of the formula

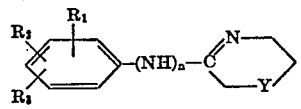

wherein
$R_1$, $R_2$ and $R_3$ are each hydrogen, fluorine, chlorine, bromine, alkyl of 1 to 3 carbon atoms, methoxy, ethoxy, cyano or trifluoromethyl,
Y is oxygen or sulfur, and
n is 1 or 2,
or a non-toxic, pharmacologically acceptable acid addition salt thereof.

2. A compound of claim 1, wherein
$R_1$ is hydrogen, chlorine, bromine, methyl or methoxy,
$R_2$ is hydrogen, chlorine, bromine or methyl,
$R_3$ is hydrogen or chlorine,
Y is oxygen or sulfur, and
n is 1 or 2, 3. A compound of the claim 2 of the formula

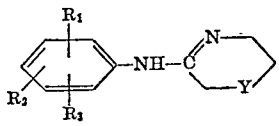

wherein
$R_1$ is hydrogen, chlorine, bromine, methyl or methoxy,
$R_2$ is hydrogen, chlorine, bromine or methyl,
$R_3$ is hydrogen or chlorine, and
Y is oxygen or sulfur,
or a non-toxic, pharmacologically acceptable acid addition salt thereof.

4. A compound of claim 2 of the formula

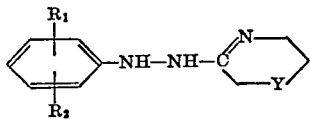

wherein
$R_1$ and $R_2$ are each chlorine or methyl, and
Y is oxygen or sulfur,
or a non-toxic, pharmacologically acceptable acid addition salt thereof.

5. A compound of claim 2, which is 3-(2'-chloro-6'-methyl-anilino)-2H,5,6-dihydro-1,4-oxazine or a non-toxic, pharmacologically acceptable acid addition salt thereof.

6. A compound of claim 2, which is 3-(2',6'-dimethyl-anilino) - 2H,5,6 - dihydro-1,4-oxazine or a non-toxic, pharmacologically acceptable acid addition salt thereof.

7. A compound of claim 2, which is 3-[N'-(2',6'-dichloro-phenyl)-hydrazino] - 2H,5,6 - dihydro - 1,4-oxazine or a non-toxic, pharmacologically acceptable acid addition salt thereof.

References Cited
FOREIGN PATENTS
1,558,915   1/1969   France _____ 260—244

HARRY I. MOATZ, Primary Examiner

U.S. Cl. X.R.
260—243 B; 424—246, 248